United States Patent
Lamb, Jr.

(10) Patent No.: US 10,407,177 B2
(45) Date of Patent: Sep. 10, 2019

(54) CONVERTIBLE ENGINE EXHAUST FOR ROTOCRAFT

(71) Applicant: Sikorsky Aircraft Corporation, Stratford, CT (US)

(72) Inventor: Donald William Lamb, Jr., North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 339 days.

(21) Appl. No.: 15/315,202

(22) PCT Filed: May 22, 2015

(86) PCT No.: PCT/US2015/032107
§ 371 (c)(1),
(2) Date: Nov. 30, 2016

(87) PCT Pub. No.: WO2015/183715
PCT Pub. Date: Dec. 3, 2015

(65) Prior Publication Data
US 2017/0121033 A1    May 4, 2017

Related U.S. Application Data

(60) Provisional application No. 62/005,007, filed on May 30, 2014.

(51) Int. Cl.
  *B64D 33/04*   (2006.01)
  *B64C 27/04*   (2006.01)
  *F02K 1/00*    (2006.01)

(52) U.S. Cl.
  CPC .............. *B64D 33/04* (2013.01); *B64C 27/04* (2013.01); *F02K 1/002* (2013.01); *F05D 2220/329* (2013.01); *Y02T 50/6765* (2018.05)

(58) Field of Classification Search
  CPC .... B64D 33/04; F02K 1/002; F05D 2220/329
  See application file for complete search history.

(56) References Cited

U.S. PATENT DOCUMENTS 3,981,463 A * 9/1976 Pazmany ............... B64D 33/04
                                        244/110 B
4,502,639 A * 3/1985 Szuminski ............. F02K 1/825
                                        239/265.31
(Continued)

FOREIGN PATENT DOCUMENTS

EP      0406155 A1   1/1991

OTHER PUBLICATIONS

Extended European Search Report for related European Application No. 15799545.7; dated Nov. 30, 2017; 7 pages.
(Continued)

*Primary Examiner* — Brian M O'Hara
(74) *Attorney, Agent, or Firm* — Cantor Colburn LLP

(57) ABSTRACT

An exhaust system for a rotary wing aircraft includes a diffuser located at an airframe of the rotary wing aircraft and operably connected to an engine of the rotary wing aircraft, and a chimney extending upwardly from a diffuser wall. A door is movably positioned at the diffuser to selectively direct an engine exhaust flow through the diffuser or through the chimney. A rotary wing aircraft includes an airframe, a rotor system positioned at the airframe and rotatable about a rotor axis, and an engine operably connected to the rotor system to drive rotation of the rotor system. The aircraft includes an engine exhaust system including a diffuser positioned at the airframe and operably connected to the engine, a chimney extending upwardly from a diffuser wall, and a door positioned at the diffuser to selectively direct an engine exhaust flow through the diffuser or through the chimney.

15 Claims, 5 Drawing Sheets

(56) References Cited

U.S. PATENT DOCUMENTS

| | | | |
|---|---|---|---|
| 4,662,174 A | | 5/1987 | Toulmay |
| 4,821,979 A | * | 4/1989 | Denning ................ F02K 1/002 239/265.33 |
| 5,699,966 A | * | 12/1997 | Beverage ............... F02K 1/006 239/265.19 |
| 6,971,240 B2 | * | 12/2005 | Wollenweber ......... B64D 33/04 239/265.19 |
| 8,439,295 B2 | * | 5/2013 | Belyew ................. B01D 46/10 244/53 B |
| 2001/0024165 A1 | | 9/2001 | Steen, III et al. |
| 2003/0192737 A1 | | 10/2003 | Han et al. |
| 2006/0274644 A1 | | 12/2006 | Budampati et al. |
| 2007/0076650 A1 | | 4/2007 | Manjeshwar et al. |
| 2009/0022121 A1 | | 1/2009 | Budampati et al. |
| 2013/0044661 A1 | | 2/2013 | Jokimies et al. |

OTHER PUBLICATIONS

International Search Report and the Written Opinion; International Application No. PCT/US2015/032107; International Filing Date: May 22, 2016; dated Aug. 17, 2015; 13 Pages.

* cited by examiner

CONVERTIBLE ENGINE EXHAUST FOR ROTOCRAFT

CROSS REFERENCE TO RELATED APPLICATIONS

This application claims the benefit of PCT Application No. PCT/US2015/032107, filed on May 22, 2015, which in turn claims priority to U.S. provisional patent application Ser. No. 62/005,007, filed May 30, 2014. The entire contents of PCT Application No. PCT/US2015/032107, and U.S. provisional patent application Ser. No. 62/005,007, are incorporated herein by reference.

BACKGROUND

The subject matter disclosed herein generally relates to engine systems for powering rotary winged aircraft. More specifically, the subject disclosure relates to exhaust systems for engines of rotary winged aircraft.

Typical rotary wing aircraft, such as helicopters, have one or more engines located at the airframe. These engines are connected to a rotor system, often via a gearbox. The engine produces exhaust, which is expelled from the aircraft via an exhaust duct.

In military aircraft gas turbine engines, it is highly desirable that infrared emissions from the engine be reduced to a practical minimum to avoid acquisition and tracking by heat seeking, hostile forces, or to permit effective countermeasures such as evasive action to be taken against such forces. Further, exhaust passageways are typically oriented to allow direct line of sight into the engine core. In helicopters, infrared suppression is typically achieved by directing the exhaust upwardly out of the airframe, via a duct with a bend in the duct to transfer the exhaust from a horizontal flow to a vertical flow. With such a configuration, the infrared signature is substantially blocked from below the aircraft and from behind the aircraft, and there is no direct line of sight into the engine core.

While the above configuration may have the desired effect on the infrared signature of the engine exhaust, the system inherently results in performance losses of both the engines and of the aircraft, as the force of the upwardly traveling exhaust acts opposite to the lift forces generated by the rotor system.

BRIEF SUMMARY

In one embodiment, an exhaust system for a rotary wing aircraft includes a diffuser located at an airframe of the rotary wing aircraft and operably connected to an engine of the rotary wing aircraft, and a chimney extending upwardly from a diffuser wall. A door is movably positioned at the diffuser to selectively direct an engine exhaust flow rearwardly through the diffuser to a diffuser exit or upwardly through the chimney to a chimney exit.

Alternatively or additionally, in this or other embodiments the door is pivotably secured at the diffuser to rotate about a door axis.

Alternatively or additionally, in this or other embodiments a piston actuator is operably connected to the door to drive rotation of the door about the door axis.

Alternatively or additionally, in this or other embodiments a torsional motor is operably connected to the door to drive rotation of the door about the door axis.

Alternatively or additionally, in this or other embodiments the torsional motor is located at the door axis.

Alternatively or additionally, in this or other embodiments an insulation layer is applied to at least one surface of the door.

Alternatively or additionally, in this or other embodiments the insulation layer is an infrared suppressing foil or a thermal barrier coating.

Alternatively or additionally, in this or other embodiments a locking mechanism is utilized to secure the door in a selected position.

Alternatively or additionally, in this or other embodiments the locking mechanism includes a locking actuator fixed to the airframe, and a wedge member operably connected to the locking actuator configured to interact with the door, locking the door in a selected position when the locking actuator is activated.

In another embodiment, a rotary wing aircraft includes an airframe, a rotor system positioned at the airframe and rotatable about a rotor axis, and an engine operably connected to the rotor system to drive rotation of the rotor system. The aircraft includes an engine exhaust system including a diffuser positioned at the airframe and operably connected to the engine, a chimney extending upwardly from a diffuser wall, and a door movably positioned at the diffuser to selectively direct an engine exhaust flow rearwardly through the diffuser to a diffuser exit or upwardly through the chimney to a chimney exit.

Alternatively or additionally, in this or other embodiments the door is pivotably secured at the diffuser to rotate about a door axis.

Alternatively or additionally, in this or other embodiments a piston actuator is operably connected to the door to drive rotation of the door about the door axis.

Alternatively or additionally, in this or other embodiments a torsional motor is operably connected to the door to drive rotation of the door about the door axis.

Alternatively or additionally, in this or other embodiments an insulation layer is applied to at least one surface of the door.

Alternatively or additionally, in this or other embodiments a locking mechanism is utilized to secure the door in a selected position. The locking mechanism includes a locking actuator fixed to the airframe and a wedge member operably connected to the locking actuator configured to interact with the door, locking the door in a selected position when the locking actuator is activated.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
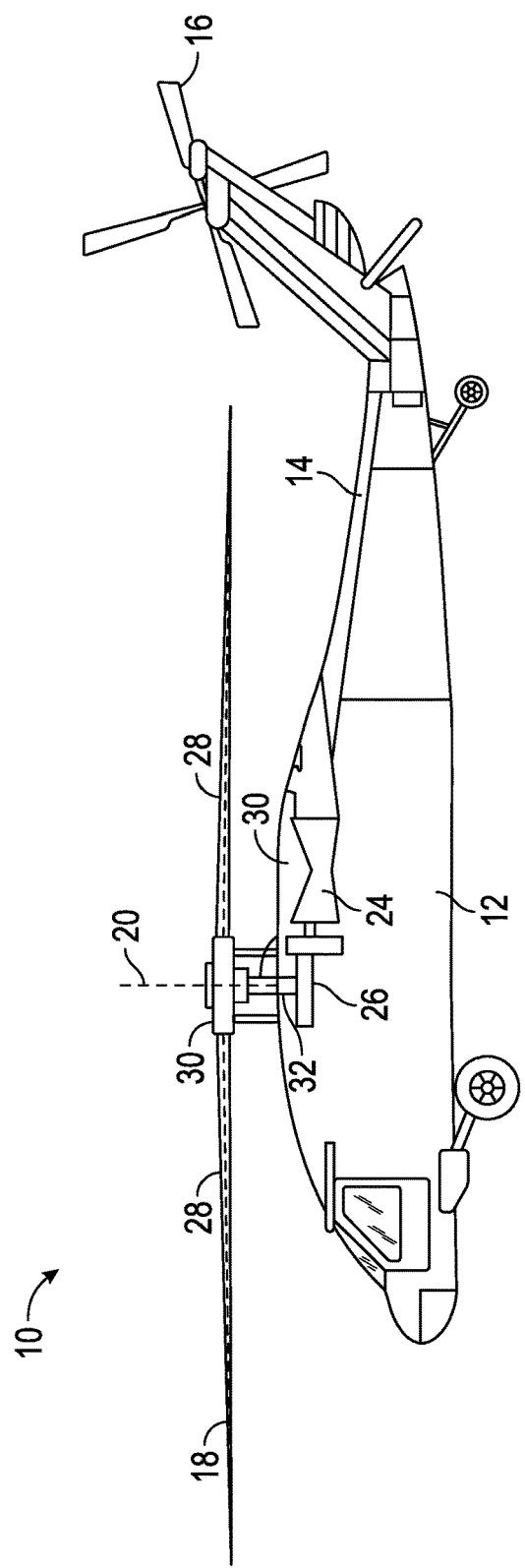
FIG. 1 is a general side view of an embodiment of a rotary wing aircraft.

Shown in FIG. 1 is a schematic view of an embodiment of a rotary wing aircraft, in this embodiment a helicopter 10. The helicopter 10 includes an airframe 12 with an extending tail 14. A main rotor assembly 18 is located at the airframe 12 and rotates about a main rotor axis 20. The main rotor assembly 18 is driven by a power source, for example, an engine 24 via a gearbox 26 about the main rotor axis 20. The rotor assembly 18 includes a plurality of rotor blades 28 secured to a rotor hub 30, with a main rotor shaft 32 connected to the rotor hub 30 and to the gearbox 26 to transfer rotational energy from the gearbox 26 to the main rotor assembly 18. In some embodiments, the helicopter 10 further includes a tail rotor 16 located at the extending tail 14 to provide yaw control for the helicopter 10. The tail rotor 16 is connected to and driven by the engine 24 via the gearbox 26. While shown as a single rotor, it is understood that aspects of the inventions can be used in coaxial rotor-craft, tilt rotor and tilt wing aircraft, and other rotary winged aircraft. Further, while one engine 24 is shown in FIG. 1, it is to be appreciated that some embodiments may include two or more engines 24.

Figure 2:
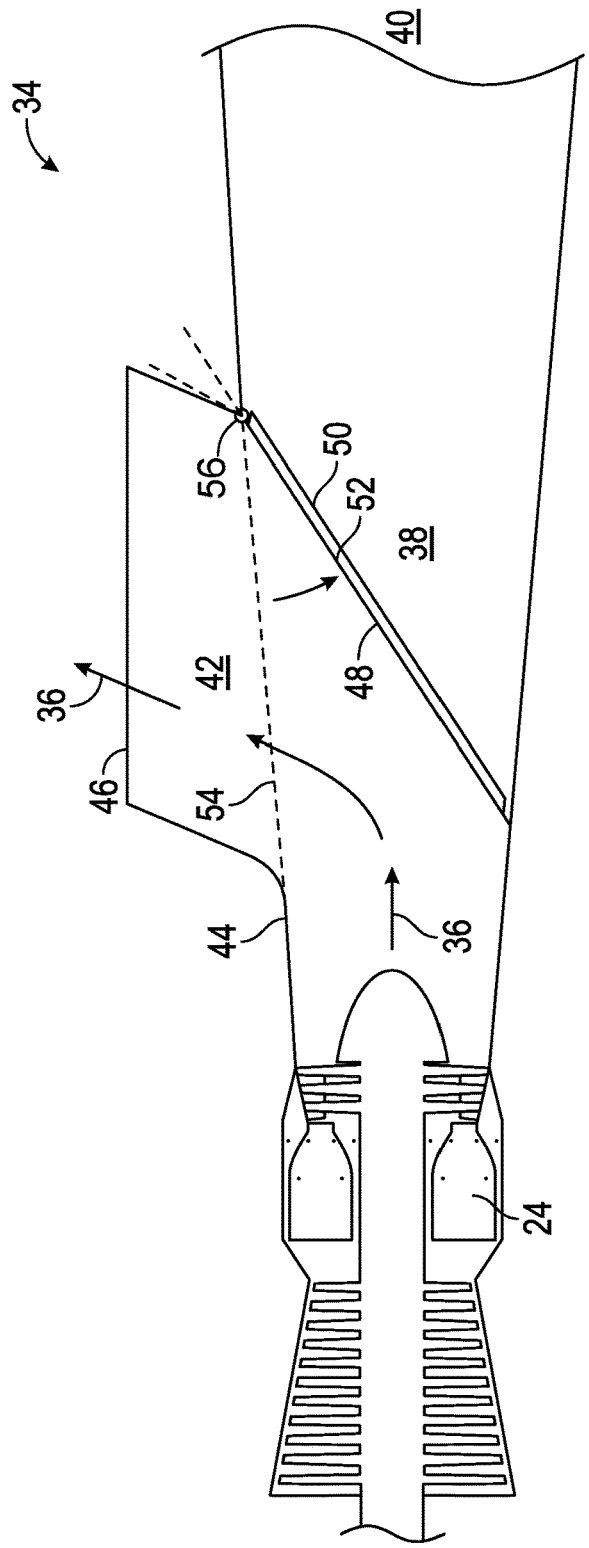
FIG. 2 is a side view of an embodiment of an exhaust system for a rotary wing aircraft.

Referring to FIG. 2, the helicopter 10 includes an exhaust system 34 to direct an exhaust flow 36 from the engine 24 and expel the exhaust flow 36 from the helicopter 10. The exhaust flow 36 is high temperature and may produce an infrared signature that may allow for acquisition and tracking by heat seeking, hostile forces if line of sight to the exhaust flow 36 is achieved by the hostile forces. To prevent such acquisition, the exhaust system 34 includes suppression mechanisms that may be activated when desired, and also deactivated so that performance degradation due to the activated suppressor only occurs when the suppression technology is needed, for example, when the helicopter 10 is operating in a hostile zone or hostile airspace.

The exhaust system 34 includes a diffuser 38 to direct the exhaust flow 36 rearwardly to a diffuser exit 40 and a chimney 42 extending upwardly from a diffuser wall 44 to direct exhaust flow 36 upwardly to a chimney exit 46. The exhaust system 34 further includes a movable door 48 located in the diffuser 38 to selectively block the exhaust flow 36 from one of the diffuser 38 and the chimney 42 and directing the exhaust flow 36 to the other of the diffuser 38 and the chimney 42. When it is desired to suppress the infrared signature of the exhaust flow 36, the door 48 is moved to a first position preventing the exhaust flow 36 from reaching the diffuser exit 40. Instead, the door 48 directs the exhaust flow 36 through the chimney 42 and out of the chimney exit 46. To further suppress the infrared signature, an insulation layer 50 is applied to a surface, for example rearward surface 52, of the door 48. In some embodiments, the insulation layer 50 is an infrared suppressing foil or a thermal barrier coating.

Figure 3:
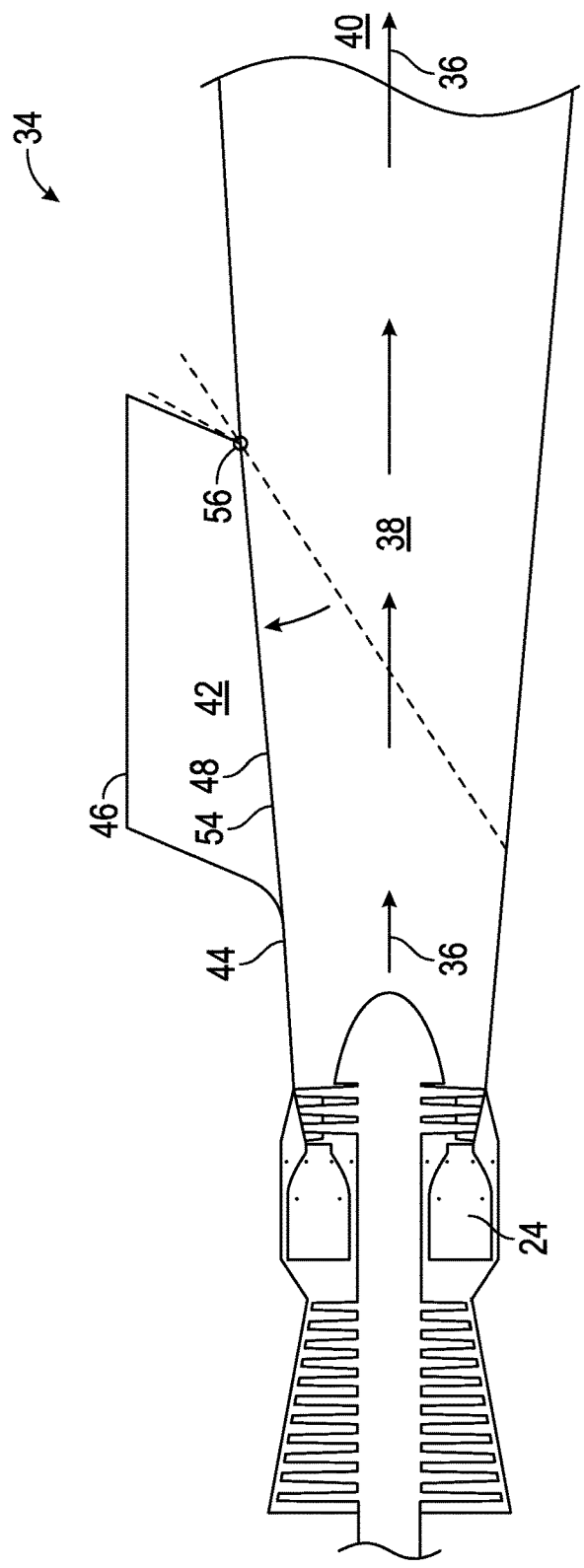
FIG. 3 is another side view of an embodiment of an exhaust system for a rotary wing aircraft.

Referring to FIG. 3, when suppression of the infrared signature is not needed or desired, the door 48 is moved to a second position blocking a chimney entrance 54, thus directing the exhaust flow 36 down a length of the diffuser 38 and through the diffuser exit 40. Directing the exhaust flow 36 down the diffuser 38 rather than up through the chimney 42 reduces performance losses associated with the suppression system when the suppression is not desired. The door 48 is actuated via pilot command. Actuation of the door 48 between the first and second positions may be accomplished in one of several ways, examples of which will be described in the following.

Figure 4:
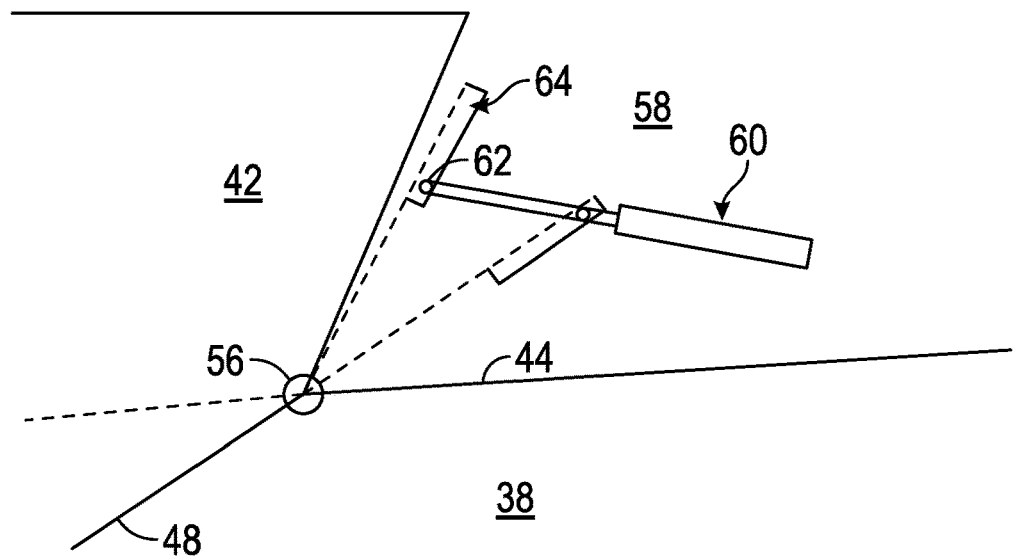
FIG. 4 is a side view of an embodiment of a door assembly of an exhaust system for a rotary wing aircraft.
Figure 5:
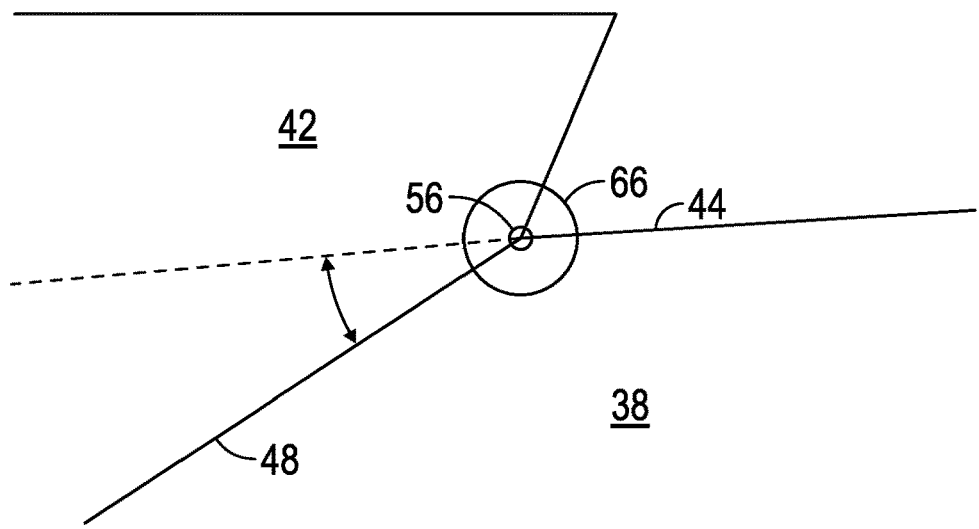
FIG. 5 is a side view of another embodiment of a door assembly of an exhaust system for a rotary wing aircraft.
Figure 6:
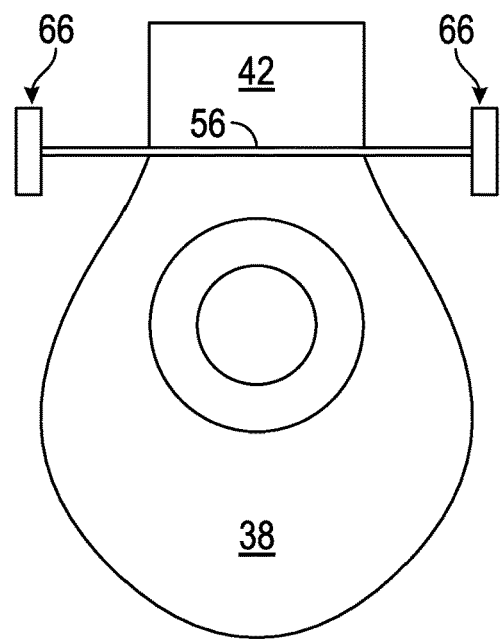
FIG. 6 is a rear view of an embodiment of a door assembly of an exhaust system for a rotary wing aircraft.

Referring to FIG. 4, the door 48 is pivotably located at the diffuser wall 44 so as to rotate about door axis 56. The door 48 extends through the diffuser wall 44 to an exterior 58 of the diffuser 38 where the door 48 is operably connected to a piston actuator 60 fixed to the airframe 12. In some embodiments, the door 48 is connected to the piston actuator 60 via a pin 62 and slide arrangement 64. In this embodiment, extension of the piston actuator 60 results in the movement of the door 48 across the diffuser 38 to the first position to direct the exhaust flow 36 through the chimney 42, while retraction of the piston actuator 60 results in the movement of the door 48 across the chimney 42 to the second position to direct the exhaust flow 36 through the diffuser 38. Referring now to FIGS. 5 and 6, one or more torsional motors 66 may be connected to the door 48 at the door axis 56 to effect rotation of the door 48.

Figure 7:
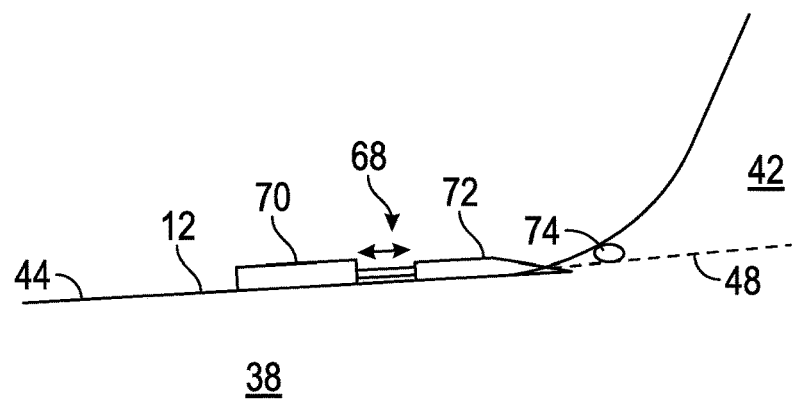
FIG. 7 is a side view of an embodiment of a latch mechanism for a door of an exhaust system for a rotary wing aircraft.

Referring to FIG. 7, in some embodiments, the exhaust system 34 includes a locking mechanism 68 to lock the door 48 into the second position blocking the chimney 42. A locking actuator 70 is fixed to the airframe 12 and attached to a wedge clamp 72. When the locking actuator 70 is actuated, the wedge clamp 72 is extended beneath the door 48 securing the door 48 in the second position across the chimney 42. Further, a door seal 74 may be positioned between the door 48 and the chimney 42. The door seal 74 is compressed when the door 48 is moved to the second position thus sealing between the door 48 and the chimney 42. While the locking mechanism 68 in the present embodiment is positioned to lock the door 48 in the second position, in other embodiments additional or alternative locking mechanisms may be utilized to lock the door 48 in the first position, blocking the diffuser 38.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An exhaust system for a rotary wing aircraft comprising:

a diffuser disposed at an airframe of the rotary wing aircraft and operably connected to an engine of the rotary wing aircraft, the diffuser including a wall having an inner surface including an opening, and a diffuser exit;

a chimney extending upwardly from the diffuser wall at the opening, the chimney including a chimney exit; and a door movably mounted to the diffuser wall, the door being selectively shifted from a first position covering the opening and blocking the chimney so as to direct an engine exhaust flow rearwardly through the diffuser to the diffuser exit and a second position blocking the diffuser outlet so as to guide the exhaust flow upwardly through the chimney to the chimney exit.

2. The exhaust system of claim 1, wherein the door is pivotably secured at the diffuser to rotate about a door axis.

3. The exhaust system of claim 2, further comprising a piston actuator operably connected to the door to drive rotation of the door about the door axis.

4. The exhaust system of claim 2, further comprising a torsional motor operably connected to the door to drive rotation of the door about the door axis.

5. The exhaust system of claim 4, wherein the torsional motor is disposed at the door axis.

6. The exhaust system of claim 1, wherein an insulation layer is applied to at least one surface of the door.

7. The exhaust system of claim 6, wherein the insulation layer is an infrared suppressing foil or a thermal barrier coating.

8. The exhaust system of claim 1, further comprising a locking mechanism to secure the door in a selected position.

9. The exhaust system of claim 8, wherein the locking mechanism includes:
a locking actuator fixed to the airframe; and
a wedge member operably connected to the locking actuator configured to interact with the door, locking the door in a selected position when the locking actuator is activated.

10. A rotary wing aircraft comprising:
an airframe;
a rotor system disposed at the airframe and rotatable about a rotor axis;
an engine operably connected to the rotor system to drive rotation of the rotor system; and,
an engine exhaust system comprising:
a diffuser disposed at the airframe and operably connected to the engine, the diffuser including a wall having an inner surface including an opening, and a diffuser exit;
a chimney extending upwardly from the diffuser wall at the opening, the chimney including a chimney exit; and
a door mounted to the diffuser wall, the door being selectively shifted from a first position covering the opening and blocking the chimney so as to direct an engine exhaust flow rearwardly through the diffuser to the diffuser exit and a second position blocking the diffuser outlet so as to guide the exhaust flow upwardly through the chimney to the chimney exit.

11. The aircraft of claim 10, wherein the door is pivotably secured at the diffuser to rotate about a door axis.

12. The aircraft of claim 11, further comprising a piston actuator operably connected to the door to drive rotation of the door about the door axis.

13. The aircraft of claim 11, further comprising a torsional motor operably connected to the door to drive rotation of the door about the door axis.

14. The aircraft of claim 10, wherein an insulation layer is applied to at least one surface of the door.

15. The aircraft of claim 10, further comprising a locking mechanism to secure the door in a selected position, the locking mechanism including:
a locking actuator fixed to the airframe; and
a wedge member operably connected to the locking actuator configured to interact with the door, locking the door in a selected position when the locking actuator is activated.

* * * * *